(12) United States Patent
Zhang et al.

(10) Patent No.: US 11,033,965 B2
(45) Date of Patent: Jun. 15, 2021

(54) METHOD FOR PREPARING REDUCED TITANIUM POWDER BY MULTISTAGE DEEP REDUCTION

(71) Applicant: Northeastern University, Shenyang (CN)

(72) Inventors: Ting an Zhang, Shenyang (CN); Zhi he Dou, Shenyang (CN); Yan Liu, Shenyang (CN); Guo zhi LV, Shenyang (CN); Qiu yue Zhao, Shenyang (CN); Li ping Niu, Shenyang (CN); Da xue Fu, Shenyang (CN); Wei guang Zhang, Shenyang (CN)

(73) Assignee: NORTHEASTERN UNIVERSITY, Shenyang (CN)

( * ) Notice: Subject to any disclaimer, the term of this patent is extended or adjusted under 35 U.S.C. 154(b) by 272 days.

(21) Appl. No.: 16/319,197

(22) PCT Filed: May 21, 2018

(86) PCT No.: PCT/CN2018/087688
§ 371 (c)(1),
(2) Date: Jan. 18, 2019

(87) PCT Pub. No.: WO2018/214849
PCT Pub. Date: Nov. 29, 2018

(65) Prior Publication Data
US 2019/0283139 A1    Sep. 19, 2019

(30) Foreign Application Priority Data

May 23, 2017   (CN) .......................... 201710365974.3

(51) Int. Cl.
*B22F 9/20*     (2006.01)
*C22B 34/12*    (2006.01)
*C22B 5/18*     (2006.01)

(52) U.S. Cl.
CPC ................. *B22F 9/20* (2013.01); *C22B 5/18* (2013.01); *C22B 34/1245* (2013.01);
(Continued)

(58) Field of Classification Search
None
See application file for complete search history.

(56) References Cited

U.S. PATENT DOCUMENTS 6,231,636 B1    5/2001  Froes
10,907,239 B1 * 2/2021  Fang ......................... B22F 9/22
(Continued)

FOREIGN PATENT DOCUMENTS

CN      104120304 A     10/2014
CN      104131128 A     11/2014
(Continued)

OTHER PUBLICATIONS

Dou, Zhihe et al., "Research Progresses on the Preparation of Powders and Alloys by SHS-Metallurgy," Materials China, vol. 35, No. 8, Aug. 2016, pp. 598-605, with English abstract.

*Primary Examiner* — George Wyszomierski
(74) *Attorney, Agent, or Firm* — Muncy, Geissler, Olds & Lowe, P.C.

(57) ABSTRACT

Provided is a method for preparing a reduced titanium powder by a multistage deep reduction, including the following steps of: uniformly mixing a dried titanium dioxide powder with a magnesium powder to obtain a mixture, adding the mixture in a self-propagating reaction furnace, triggering a self-propagating reaction, obtaining an intermediate product of which low-valence titanium oxides $Ti_xO$ are dispersed in an MgO matrix, leaching the intermediate product with a hydrochloric acid as a leaching solution, performing filtering, washing and vacuum drying to obtain a low-valence titanium oxide $Ti_xO$ precursor, uniformly
(Continued)

mixing the low-valence titanium oxide $Ti_xO$ precursor with a calcium powder, performing a pressing to obtain semi-finished products, placing the semi-finished products in a vacuum reduction furnace for a second-time deep reduction, and leaching a deep reduction product with a hydrochloric acid as a leaching solution so as to obtain the reduced titanium powder.

10 Claims, 1 Drawing Sheet

(52) U.S. Cl.
CPC ...... *C22B 34/1268* (2013.01); *C22B 34/1277* (2013.01); *C22B 34/1295* (2013.01); *B22F 2301/205* (2013.01); *Y02P 10/20* (2015.11)

(56) References Cited

U.S. PATENT DOCUMENTS

| | | | | |
|---|---|---|---|---|
| 2006/0174727 | A1* | 8/2006 | Bick | C01B 6/02 75/364 |
| 2010/0313709 | A1* | 12/2010 | Ikarashi | C22C 9/00 75/351 |
| 2015/0292057 | A1* | 10/2015 | Kumari | C22B 34/10 75/420 |

FOREIGN PATENT DOCUMENTS

| | | |
|---|---|---|
| CN | 104131178 A | 11/2014 |
| CN | 104822850 B | 4/2017 |
| CN | 107236869 A | 10/2017 |
| GB | 813999 A * | 5/1959 |
| KR | 100257476 B1 * | 6/2000 |

* cited by examiner

METHOD FOR PREPARING REDUCED TITANIUM POWDER BY MULTISTAGE DEEP REDUCTION

BACKGROUND OF THE INVENTION

1. Field of the Invention

The invention belongs to the technical field of powder preparation in a powder metallurgy technology, and particularly relates to a method for preparing a reduced titanium powder by a multistage deep reduction.

2. The Prior Arts

Titanium is a new structural and functional material emerging in the 20th century with echo-making significance in human history. Compared with other metals, titanium possesses a series of special physical and chemical properties such as low density, high specific strength, excellent corrosion resistance, and good high-temperature performance. As an important titanium material, titanium powder is mainly used as a grain refiner for aluminum alloys, special fireworks and a detonating agent. Titanium powder can also be used as an electrovacuum getter, a surface coating additive, and a raw material for powder metallurgy and 3D printing. China's titanium powder manufacturing industry is in a tough situation. Particularly, demands for titanium metal powder surge as the 3D printing industry grows rapidly. Currently, China's titanium powder manufacturing industry adopts titanium sponge as a raw material for industrial production of titanium powder by a physical and mechanical crushing method or a hydrogenation-dehydrogenation method. The prepared titanium metal powder has the defects of secondary pollution by impurities, undesirable titanium powder size distribution, poor activity and the like, so that the application of titanium powder is seriously influenced.

In view of technical problems existing in conventional titanium metal powder preparing methods, the method disclosed by the invention adopts a new idea for directly preparing titanium powder by multistage deep reduction based on the systematic analysis of the valence evolving law in the reduction process of titanium oxides, i.e., firstly an intermediate product (product of combustion) is obtained through a fast self-propagating reaction (first-time reduction), then multistage deep reduction is performed on the intermediate product to obtain the deep reduction product, and finally the deep reduction product is subjected to acid leaching, impurity removing and purification to obtain titanium metal powder.

As traditional methods for preparing titanium powder with titanium sponge are high in costs and impurities in the titanium sponge have a great effect on the performance of the titanium powder, and the method for preparing the titanium powder by using titanium oxides as raw materials has a bigger development space. Besides, if titanium powder is prepared by the self-propagating reaction method, advantages of being short in the process flow, free from intermediate working procedures, low in cost, and good in product properties, can be achieved, so that continuation is easy to achieve. The method for preparing the titanium metal powder by multistage deep reduction is one of the most promising titanium preparing processes, conforms to the national economic development strategy of reducing raw material cost and saving energy, and has remarkable industrial economic effects and social effects.

SUMMARY OF THE INVENTION

In view of the defects existing in the preparation process of titanium powder in the prior art, the invention provides a method for preparing a reduced titanium powder by a multistage deep reduction, with which the reduced titanium powder product with a low oxygen content is obtained through self-propagating high-temperature synthesis, deep reduction and diluted acid leaching. The prepared reduced titanium powder is mainly used for slag forming constituents for welding materials such as covered electrodes, as well as for deoxygenation or dehydrogenation processes. The method has the advantages of being low in cost of raw materials, simple to operate, and low in requirements for process conditions and instruments and equipment, lays the foundations for industrial production. The resultant reduced titanium powder has the advantages of being high in purity, fine in particle size, controllable in particle size distribution, high in powder activity and the like.

The method for preparing a reduced titanium powder by a multistage deep reduction of the comprises the following steps:

Step 1: Self-Propagating Reaction:

Placing a titanium dioxide powder in a drying oven, performing drying to obtain a dried titanium dioxide powder, uniformly mixing the dried titanium dioxide powder with a magnesium powder to obtain a mixture, adding the mixture in a self-propagating reaction furnace, after reacted materials are cooled, obtaining an intermediate product of which low-valence titanium oxides $Ti_xO$ are dispersed in an MgO matrix, wherein $TiO_2:Mg=1:0.8-1.2$ by molar ratio, and the intermediate product of which the low-valence titanium oxides $Ti_xO$ dispersed in the MgO matrix is a mixture of non-stoichiometric-ratio low-valence titanium oxides, with x being in the range of 0.6-1.

Step 2: First-Time Leaching:

Placing the intermediate product of which the low-valence titanium oxides $Ti_xO$ are dispersed in the MgO matrix in a sealed reaction kettle, leaching the intermediate product with a hydrochloric acid as a leaching solution to obtain a filtrate and a leached product, removing the filtrate, washing the leached product, and performing a vacuum drying to obtain a low-valence titanium oxide $Ti_xO$ precursor, wherein a molar concentration of the hydrochloric acid is 1-6 mol/L;

Step 3: Second-Time Deep Reduction:

Uniformly mixing the low-valence titanium oxide $Ti_xO$ precursor with a calcium powder, and performing a pressing at 2-20 MPa to obtain block-shaped semi-finished products, placing the block-shaped semi-finished products in a vacuum reduction furnace, performing heating to raise a temperature of 700-1200° C., performing the second-time deep reduction for 1-6 h, after the second-time deep reduction, obtaining the block-shaped semi-finished products, cooling the block-shaped semi-finished products along with the furnace to obtain a deep reduction product, wherein $Ti_xO:Ca=1:1.5-3$ by molar ratio in the low-valence titanium oxide $Ti_xO$ precursor.

Step 4: Second-Time Leaching:

Placing the deep reduction product in the sealed reaction kettle, leaching the deep reduction product with a hydrochloric acid as a leaching solution to obtain a leaching solution and filtered residues, removing the leaching solution, washing the filtered residues, and performing a vacuum drying so as to obtain a reduced titanium powder, wherein the molar concentration of hydrochloric acid is 1-6 mol/L, wherein the reduced titanium powder comprises the following components in percentage by mass of 98-99.5% of Ti, 0.1-2% of O, and the balance being unavoidable impurities, with a size of 8-42 μm.

In the step 1, the mixture is treated by one of the following two manners before being placed in the self-propagating reaction furnace:

Mode I: performing a pressing at 10-60 MPa to obtain the block-shaped semi-finished products, and then adding the block-shaped semi-finished products to the self-propagating reaction furnace; and Mode II: adding the mixture to the self-propagating reaction furnace directly without treatment.

In the step 1, drying is performed, wherein the drying is performed at 100-150° C. for 24 h or above.

In the step 1, the self-propagating reaction is performed, so that in the first-time reduction reaction of the self-propagating manner, the intermediate product mainly comprises titanium monoxide, energy consumption can be saved, and besides, in the reduction reaction process, generation of compound metal oxidate impurities can be restrained.

In the step 1, methods for triggering the self-propagating reaction comprises a local ignition method and a whole heating method, wherein the local ignition method means that electric heating wires are used to heat a part of the mixture in the self-propagating reaction furnace to trigger the self-propagating reaction; and the whole heating method means that a temperature of the mixture is wholly raised in the self-propagating reaction furnace until the self-propagating reaction occurs, wherein the temperature is controlled to be 500-750° C.

In the step 2, when the hydrochloric acid is used as the leaching solution for leaching the intermediate product, an addition amount of a diluted hydrochloric acid and an addition amount of the intermediate product are in a compounding ratio of a hydrochloric acid excess proportion of 10-40% according to a reaction theory, and its reaction is performed according to the chemical reaction equation $MgO+2H^+=Mg^{2+}+H_2O$.

In the step 2, a leaching temperature of the leached intermediate product is 20-30° C. and a leaching time is 60-180 min.

In the step 2, the resultant low-valence titanium oxide $Ti_xO$ precursor consists of the following components in percentage by mass: 75-88% of Ti, 12-25% of O, and unavoidable impurities being smaller than or equal to 0.5%, wherein a sum of the percentage by mass of all components are 100%, with a size of 0.8-15 μm.

In the step 2, the specific steps of the washing and the vacuum drying comprise: washing the leached product without the filtrate, with a water until a washing liquid is neutral, and then performing the drying in a vacuum drying oven at a drying temperature of 20-30° C. for at least 24 h; and the washing is performed with the water, specifically a dynamic washing is adopted, i.e., a constant level of the washing liquid is maintained in a washing tank in a washing process by supplementing a same amount of a fresh water as the washing liquid which is drained, and the washing is performed until the washing liquid is neutral.

In the step 3, the second-time deep reduction reaction specifically comprises: raising the temperature in the vacuum reduction furnace at a vacuum degree of being smaller than or equal to 10 Pa.

In the step 4, when the deep reduction product is leached, an additional amount of a diluted hydrochloric acid and an additional amount of the deep reduction product is in a compounding ratio of a hydrochloric acid excess proportion of 5-30% according to a reaction theory, and the reaction is based on a chemical reaction equation $CaO+2H^+=Ca^{2+}+H_2O$.

In the step 4, a leaching temperature of the leached deep reduction product is 20-30° C. and a leaching time is 15-90 min.

In the step 4, the specific steps of the washing and the vacuum drying comprise: washing the leached product without the leaching solution, with a water until a washing liquid is neutral, and then performing the drying in a vacuum drying oven at a drying temperature of 20-30° C. for at least 24 h; and the washing is performed with the water, specifically a dynamic washing is adopted, i.e., a constant level of the washing liquid is maintained in a washing tank in the washing process by supplementing a same amount of a fresh water as the washing liquid which is drained, and the washing is performed until the washing liquid is neutral.

The method for preparing a reduced titanium powder by a multistage deep reduction adopts the principle and has the advantages that:

(1) According to the valence evolving law of titanium oxides in the reduction process, the process of self-propagating high-temperature synthesis is used as the first-time reduction reaction, and the chemical energy of the chemical reaction is sufficiently used. In the process of self-propagating high-temperature synthesis, chemical energy is transformed into thermal energy, the reaction can spread automatically once being initiated and can be maintained without external energy; and besides, the reaction has a high temperature gradient and the product has high activity and controllable sizes. Due to high self-propagating reaction temperature, Mg can gasify in the reaction process and therefore loss of Mg can be caused. The components and phases of $Ti_xO$ products can be controlled by regulating and controlling the distribution amount of Mg.

The equation of the self-propagating high-temperature synthesis reaction is as follows:

wherein x and y are parameters in stoichiometric numbers in balancing of a chemical reaction equation, x is 0.6-1, and y is adjusted according to x.

In order to enable the self-propagating reaction to be simple to operate and energy-saving, the self-propagating reaction can be triggered with a local ignition method.

MgO impurities generated in the self-propagating reaction process are loose, products are easy to break, the MgO impurites are high in reaction activity, and the intermediate product $Ti_xO$ exists in a particle or particle skeleton form. The MgO impurites cover the surfaces of $Ti_xO$ or are stuffed into the skeletons of $Ti_xO$, so that leaching of diluted hydrochloric acid is facilitated.

(2) Hydrochloric acid excessive addition is needed to ensure complete removal of MgO in the leaching process; besides, in order to ensure the washing effect, dynamic circulating washing is adopted in the washing process, i.e., a constant level of washing liquid is maintained in a washing tank in the washing process by supplementing the same amount of fresh water as the washing liquid which is drained, and washing is performed until the washing liquid is neutral. The leaching process needs to be performed in the sealed reactor so as to ensure the leaching efficiency and prevent the intermediate product from being oxidized.

(3) In order to ensure thorough deoxygenation to obtain low-oxygen high-purity reduced titanium powder, the idea of deoxygenation by multistage deep reduction is provided, i.e., deoxygenation is performed by deep reduction of the low-valence titanium oxide precursors obtained from the self-propagating high-temperature reduction with calcium having higher reducing properties than the magnesium reducing agent used in self-propagating high-temperature reduction, so that the effect of deoxygenation by reduction is guaranteed.

The chemical reaction equation of the deep reduction reaction is as follows:

$$Ti_xO+xCa=Ti+xCaO,$$

wherein, x is 0.6-1.

(4) The process has the advantages of being high in efficiency, energy-saving, short in flow, and low in requirements for apparatus, is a clean, efficient and safe production process, and is easy for industrial promotion. The method can also be used for preparing other high-melting-point valence-variable metal powder.

DETAILED DESCRIPTION OF THE PREFERRED EMBODIMENT

The invention is further detailed below in combination with embodiments.

The titanium dioxide, magnesium powder, calcium powder and hydrochloric acid adopted in the following embodiments are industrial-grade products. Titanium dioxide is rutile, and the sizes of both magnesium powder and the calcium powder are smaller than or equal to 0.5 mm.

The self-propagating reaction furnace adopted in the following embodiments is one disclosed by Chinese patent application No. 200510047308.2, and the reaction furnace consists of a reaction vessel, a heater, sight glass, a transformer, a function recorder, a thermocouple and an air vent valve.

The duration of the self-propagating reaction in the following embodiments is 5-90 s.

The drying time in the following embodiments is 24 h at least.

Figure 1:
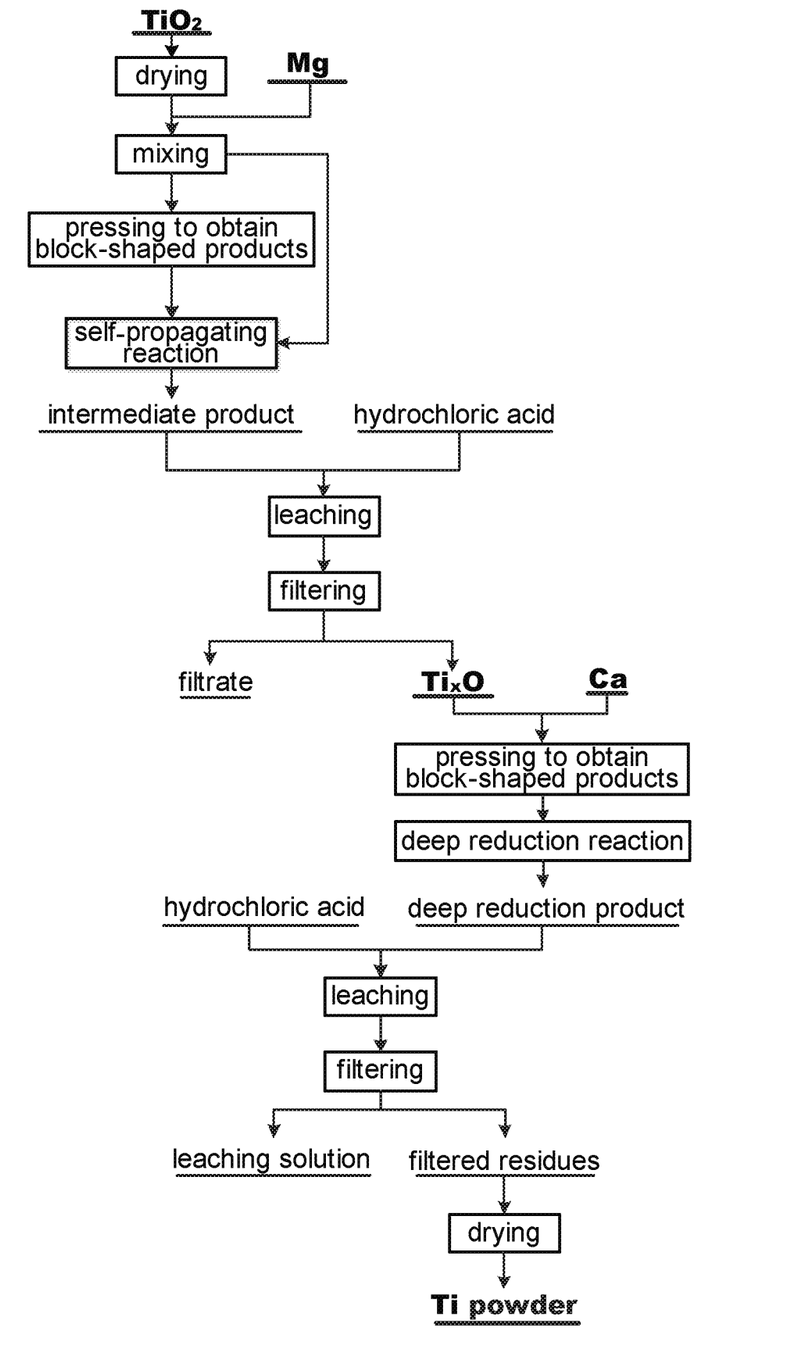
The sole FIGURE shows a process flow diagram of the method for preparing a reduced titanium powder by a multistage deep reduction of the invention.

The FIGURE shows the process flow diagram of the method for preparing reduced titanium powder by a multistage deep reduction adopted in the following embodiments.

Embodiment 1

A method for preparing a reduced titanium powder by a multistage deep reduction, comprising the following steps:

Step 1: Self-Propagating Reaction

Placing a titanium dioxide powder in a drying oven, performing drying at 100-150° C. for 24 h to obtain a dried titanium dioxide powder, uniformly mixing the dried titanium dioxide powder with a magnesium powder to obtain a mixture, pressing the mixture at 20 MPa to obtain block-shaped semi-finished products, adding the block-shaped semi-finished products of the mixture in a self-propagating reaction furnace, triggering the self-propagating reaction by a local ignition method, controlling the temperature to 500° C., after reacted materials are cooled, obtaining an intermediate product of which low-valence titanium oxides $Ti_xO$ are dispersed in an MgO matrix, wherein $TiO_2$:Mg=1:1 by molar ratio, and the intermediate product of which the low-valence titanium oxides $Ti_xO$ dispersed in the MgO matrix is a mixture of non-stoichiometric-ratio low-valence titanium oxides, with x being in the range of 0.6-1.

Step 2: First-Time Leaching

Placing the intermediate product of which the low-valence titanium oxides $Ti_xO$ are dispersed in the MgO matrix in a sealed reaction kettle, leaching the intermediate product with hydrochloric acid as a leaching solution with the leaching temperature of 25° C. and the leaching time of 120 min to obtain a filtrate and a leached product, removing the filtrate, washing the leached product, and performing a vacuum drying to obtain a low-valence titanium oxide $Ti_xO$ precursor, wherein the molar concentration of the hydrochloric acid is 2 mol/L, the addition amount of diluted hydrochloric acid and the addition amount of the intermediate product are in compounding ratio of a hydrochloric acid excess proportion of 10% according to a reaction theory.

The resultant low-valence titanium oxide $Ti_xO$ precursor consists of the following components in percentage by mass: 86% of Ti, 13.5% of O, and unavoidable impurities being smaller than or equal to 0.5%, wherein a sum of the percentage by mass of all components are 100%, with a size of 12 μm.

The steps of the washing and the vacuum drying comprise: washing the leached product without the filtrate, with a water until a washing liquid is neutral, and then performing the drying in a vacuum drying oven at a drying temperature of 20° C. for at least 24 h; and the washing is performed with the water, specifically a dynamic washing is adopted, i.e., a constant level of the washing liquid is maintained in a washing tank in the washing process by supplementing a same amount of a fresh water as the washing liquid which is drained, and the washing is performed until the washing liquid is neutral.

Step 3: Second-Time Deep Reduction

Uniformly mixing the low-valence titanium oxide $Ti_xO$ precursor with calcium powder, and performing a pressing at 5 MPa to obtain block-shaped semi-finished products, placing the block-shaped semi-finished products in a vacuum reduction furnace, under the condition that the vacuum degree is smaller than or equal to 10 Pa, performing heating to raise the temperature to 1000° C., performing the second-time deep reduction for 2 h, after the second-time deep reduction, obtaining the block-shaped semi-finished products, cooling the block-shaped semi-finished products along with the furnace to obtain a deep reduction product, wherein $Ti_xO$:Ca=1:2 by molar ratio in the low-valence titanium oxide $Ti_xO$ precursor.

Step 4: Second-Time Leaching

Placing the deep reduction product intermediate product in a sealed reaction kettle, leaching the deep reduction product with hydrochloric acid as a leaching solution with the leaching temperature of 24° C. and the leaching time of 30 min to obtain a leaching solution and filtered residues, removing the leaching solution, washing the filtered residues, and performing a vacuum drying to obtain a reduced titanium powder, wherein the molar concentration of the hydrochloric acid is 1 mol/L, the addition amount of diluted hydrochloric acid and the addition amount of the deep reduction product are in compounding ratio of a hydrochloric acid excess proportion of 12% according to a reaction theory.

The reduced titanium powder comprises the following components in percentage by mass of 99.0% of Ti, 0.23% of O, and the balance being unavoidable impurities, with a size of 34 μm.

The specific steps of the washing and the vacuum drying comprise: washing the leached product without the leaching solution, with a water until a washing liquid is neutral, and then performing the drying in a vacuum drying oven at a drying temperature of 30° C. for at least 24 h; and the washing is performed with the water, specifically a dynamic washing is adopted, i.e., a constant level of the washing liquid is maintained in a washing tank in the washing process by supplementing a same amount of a fresh water as the washing liquid which is drained, and the washing is performed until the washing liquid is neutral.

Embodiment 2

A method for preparing a reduced titanium powder by a multistage deep reduction, comprising the following steps:

Step 1: Self-Propagating Reaction

Placing a titanium dioxide powder in a drying oven, performing drying at 100-150° C. for 24 h to obtain a dried titanium dioxide powder, uniformly mixing the dried titanium dioxide powder with a magnesium powder to obtain a mixture, pressing the mixture at 40 MPa to obtain block-shaped semi-finished products, adding the block-shaped semi-finished products of the mixture in a self-propagating reaction furnace, triggering the self-propagating reaction by a local ignition method, controlling the temperature to 600° C., after reacted materials are cooled, obtaining an intermediate product of which low-valence titanium oxides $Ti_xO$ are dispersed in an MgO matrix, wherein $TiO_2:Mg=1:1.2$ by molar ratio, and the intermediate product of which the low-valence titanium oxides $Ti_xO$ dispersed in the MgO matrix is a mixture of non-stoichiometric-ratio low-valence titanium oxides, with x being in the range of 0.6-1.

Step 2: First-Time Leaching

Placing the intermediate product of which the low-valence titanium oxides $Ti_xO$ are dispersed in the MgO matrix in a sealed reaction kettle, leaching the intermediate product with hydrochloric acid as a leaching solution with the leaching temperature of 25° C. and the leaching time of 90 min to obtain a filtrate and a leached product, removing the filtrate, washing the leached product, and performing a vacuum drying to obtain a low-valence titanium oxide $Ti_xO$ precursor, wherein the molar concentration of the hydrochloric acid is 4 mol/L, the addition amount of diluted hydrochloric acid and the addition amount of the intermediate product are in compounding ratio of a hydrochloric acid excess proportion of 20% according to a reaction theory.

The resultant low-valence titanium oxide $Ti_xO$ precursor consists of the following components in percentage by mass: 75-88% of Ti, 12-25% of O, and unavoidable impurities being smaller than or equal to 0.5%, wherein a sum of the percentage by mass of all components are 100%, with a size of 8 μm.

The steps of the washing and the vacuum drying comprise: washing the leached product without the filtrate, with a water until a washing liquid is neutral, and then performing the drying in a vacuum drying oven at a drying temperature of 20° C. for at least 24 h; and the washing is performed with the water, specifically a dynamic washing is adopted, i.e., a constant level of the washing liquid is maintained in a washing tank in the washing process by supplementing a same amount of a fresh water as the washing liquid which is drained, and the washing is performed until the washing liquid is neutral.

Step 3: Second-Time Deep Reduction

Uniformly mixing the low-valence titanium oxide $Ti_xO$ precursor with calcium powder, and performing a pressing at 5 MPa to obtain block-shaped semi-finished products, placing the block-shaped semi-finished products in a vacuum reduction furnace, under the condition that the vacuum degree is smaller than or equal to 10 Pa, performing heating to raise the temperature to 900° C., performing the second-time deep reduction for 4 h, after the second-time deep reduction, obtaining the block-shaped semi-finished products, cooling the block-shaped semi-finished products along with the furnace to obtain a deep reduction product, wherein $Ti_xO:Ca=1:2.4$ by molar ratio in the low-valence titanium oxide $Ti_xO$ precursor.

Step 4: Second-Time Leaching

Placing the deep reduction product intermediate product in a sealed reaction kettle, leaching the deep reduction product with hydrochloric acid as a leaching solution with the leaching temperature of 30° C. and the leaching time of 20 min to obtain a leaching solution and filtered residues, removing the leaching solution, washing the filtered residues, and performing a vacuum drying to obtain a reduced titanium powder, wherein the molar concentration of the hydrochloric acid is 2 mol/L, the addition amount of diluted hydrochloric acid and the addition amount of the deep reduction product are in compounding ratio of a hydrochloric acid excess proportion of 26% according to a reaction theory.

The reduced titanium powder comprises the following components in percentage by mass of 98.2% of Ti, 1.05% of O, and the balance being unavoidable impurities, with a size of 28 μm.

The specific steps of the washing and the vacuum drying comprise: washing the leached product without the leaching solution, with a water until a washing liquid is neutral, and then performing the drying in a vacuum drying oven at a drying temperature of 20° C. for at least 24 h; and the washing is performed with the water, specifically a dynamic washing is adopted, i.e., a constant level of the washing liquid is maintained in a washing tank in the washing process by supplementing a same amount of a fresh water as the washing liquid which is drained, and the washing is performed until the washing liquid is neutral.

Embodiment 3

A method for preparing a reduced titanium powder by a multistage deep reduction, comprising the following steps:

Step 1: Self-Propagating Reaction

Placing a titanium dioxide powder in a drying oven, performing drying at 100-150° C. for 24 h to obtain a dried titanium dioxide powder, uniformly mixing the dried titanium dioxide powder with a magnesium powder to obtain a mixture, pressing the mixture at 60 MPa to obtain block-shaped semi-finished products, adding the block-shaped semi-finished products of the mixture in a self-propagating reaction furnace, triggering the self-propagating reaction by a local ignition method, controlling the temperature to 500° C., after reacted materials are cooled, obtaining an intermediate product of which low-valence titanium oxides $Ti_xO$ are dispersed in an MgO matrix, wherein $TiO_2:Mg=1:0.8$ by molar ratio, and the intermediate product of which the low-valence titanium oxides $Ti_xO$ dispersed in the MgO matrix is a mixture of non-stoichiometric-ratio low-valence titanium oxides, with x being in the range of 0.6-1.

Step 2: First-Time Leaching

Placing the intermediate product of which the low-valence titanium oxides $Ti_xO$ are dispersed in the MgO matrix in a sealed reaction kettle, leaching the intermediate product with hydrochloric acid as a leaching solution with the leaching temperature of 30° C. and the leaching time of 60 min to obtain a filtrate and a leached product, removing the filtrate, washing the leached product, and performing a vacuum drying to obtain a low-valence titanium oxide $Ti_xO$ precursor, wherein the molar concentration of the hydrochloric acid is 6 mol/L, the addition amount of diluted hydrochloric acid and the addition amount of the intermediate product are in compounding ratio of a hydrochloric acid excess proportion of 25% according to a reaction theory.

The resultant low-valence titanium oxide $Ti_xO$ precursor consists of the following components in percentage by mass: 79% of Ti, 21.6% of O, and unavoidable impurities being smaller than or equal to 0.4%, wherein a sum of the percentage by mass of the all components are 100%, with a size of 6 μm.

The steps of the washing and the vacuum drying comprise: washing the leached product without the filtrate, with a water until a washing liquid is neutral, and then performing the drying in a vacuum drying oven at a drying temperature of 25° C. for at least 24 h; and the washing is performed with the water, specifically a dynamic washing is adopted, i.e., a constant level of the washing liquid is maintained in a washing tank in the washing process by supplementing a same amount of a fresh water as the washing liquid which is drained, and washing is performed until the washing liquid is neutral.

Step 3: Second-Time Deep Reduction

Uniformly mixing the low-valence titanium oxide $Ti_xO$ precursor with calcium powder, and performing a pressing at 20 MPa to obtain block-shaped semi-finished products, placing the block-shaped semi-finished products in a vacuum reduction furnace, under the condition that the vacuum degree is smaller than or equal to 10 Pa, performing heating to raise the temperature to 800° C., performing the second-time deep reduction for 3 h, after the second-time deep reduction, obtaining the block-shaped semi-finished products, cooling the block-shaped semi-finished products along with the furnace to obtain a deep reduction product, wherein $Ti_xO:Ca=1:1.5$ by molar ratio in the low-valence titanium oxide $Ti_xO$ precursor.

Step 4: Second-Time Leaching

Placing the deep reduction product intermediate product in a sealed reaction kettle, leaching the deep reduction product with hydrochloric acid as a leaching solution with the leaching temperature of 30° C. and leaching time of 15 min to obtain a leaching solution and filtered residues, removing the leaching solution, washing the filtered residues, and performing a vacuum drying to obtain a reduced titanium powder, wherein the molar concentration of the hydrochloric acid is 3 mol/L, the addition amount of diluted hydrochloric acid and the addition amount of the deep reduction product are in compounding ratio of a hydrochloric acid excess proportion of 15% according to a reaction theory.

The reduced titanium powder comprises the following components in percentage by mass of 97.5% of Ti, 1.85% of O, and the balance being unavoidable impurities, with a size of 20 μm.

The specific steps of the washing and the vacuum drying comprise: washing the leached product without the leaching solution, with a water until a washing liquid is neutral, and then performing the drying in a vacuum drying oven at the drying temperature of 30° C. for at least 24 h; and the washing is performed with the water, specifically a dynamic washing is adopted, i.e., a constant level of the washing liquid is maintained in a washing tank in the washing process by supplementing a same amount of a fresh water as the washing liquid which is drained, and the washing is performed until the washing liquid is neutral.

Embodiment 4

A method for preparing a reduced titanium powder by a multistage deep reduction, comprising the following steps:

Step 1: Self-Propagating Reaction

Placing a titanium dioxide powder in a drying oven, performing drying at 100-150° C. for 24 h to obtain a dried titanium dioxide powder, uniformly mixing the dried titanium dioxide powder with a magnesium powder to obtain a mixture, pressing the mixture at 10 MPa to obtain block-shaped semi-finished products, adding the block-shaped semi-finished products of the mixture in a self-propagating reaction furnace, triggering the self-propagating reaction by a local ignition method, controlling the temperature to 550° C., after reacted materials are cooled, obtaining an intermediate product of which low-valence titanium oxides $Ti_xO$ are dispersed in an MgO matrix, wherein $TiO_2:Mg=1:1.1$ by molar ratio, and the intermediate product of which the low-valence titanium oxides $Ti_xO$ dispersed in the MgO matrix is a mixture of non-stoichiometric-ratio low-valence titanium oxides, with x being in the range of 0.6-1.

Step 2: First-Time Leaching

Placing the intermediate product of which the low-valence titanium oxides $Ti_xO$ are dispersed in the MgO matrix in a sealed reaction kettle, leaching the intermediate product with hydrochloric acid as a leaching solution with the leaching temperature of 25° C. and the leaching time of 120 min to obtain a filtrate and a leached product, removing the filtrate, washing the leached product, and performing a vacuum drying to obtain a low-valence titanium oxide $Ti_xO$ precursor, wherein the molar concentration of the hydrochloric acid is 1 mol/L, the addition amount of diluted hydrochloric acid and the addition amount of the intermediate product are in compounding ratio of a hydrochloric acid excess proportion of 10% according to a reaction theory.

The resultant low-valence titanium oxide $Ti_xO$ precursor consists of the following components in percentage by mass: 87.2% of Ti, 12.6% of O, and unavoidable impurities being smaller than or equal to 0.2%, wherein a sum of the percentage by mass of the all components are 100%, with a size of 15 μm.

The steps of the washing and the vacuum drying comprise: washing the leached product without the filtrate, with a water until a washing liquid is neutral, and then performing the drying in a vacuum drying oven at a drying temperature of 30° C. for at least 24 h; and the washing is performed with the water, specifically a dynamic washing is adopted, i.e., a constant level of the washing liquid is maintained in a washing tank in the washing process by supplementing a same amount of a fresh water as the washing liquid which is drained, and washing is performed until the washing liquid is neutral.

Step 3: Second-Time Deep Reduction

Uniformly mixing the low-valence titanium oxide $Ti_xO$ precursor with calcium powder, and performing a pressing at 5 MPa to obtain block-shaped semi-finished products, placing the block-shaped semi-finished products in a vacuum reduction furnace, under the condition that the vacuum degree is smaller than or equal to 10 Pa, performing heating to raise the temperature to 1100° C., performing the second-time deep reduction for 3 h, after the second-time deep reduction, obtaining the block-shaped semi-finished products, cooling the block-shaped semi-finished products along with the furnace to obtain a deep reduction product, wherein $Ti_xO:Ca=1:2.2$ by molar ratio in the low-valence titanium oxide $Ti_xO$ precursor.

Step 4: Second-Time Leaching

Placing the deep reduction product intermediate product in a sealed reaction kettle, leaching the deep reduction product with hydrochloric acid as a leaching solution with the leaching temperature of 24° C. and leaching time of 30 min to obtain a leaching solution and filtered residues, removing the leaching solution, washing the filtered residues, and performing a vacuum drying to obtain a reduced titanium powder, wherein the molar concentration of the hydrochloric acid is 1 mol/L, the addition amount of diluted hydrochloric acid and the addition amount of the deep reduction product are in compounding ratio of a hydrochloric acid excess proportion of 10% according to a reaction theory.

The reduced titanium powder comprises the following components in percentage by mass of 99.5% of Ti, 0.11% of O, and the balance being unavoidable impurities, with a size of 42 μm.

The specific steps of the washing and the vacuum drying comprise: washing the leached product without the leaching solution, with a water until a washing liquid is neutral, and then performing the drying in a vacuum drying oven at a drying temperature of 20° C. for at least 24 h; and the washing is performed with the water, specifically a dynamic washing is adopted, i.e., a constant level of the washing liquid is maintained in a washing tank in the washing process by supplementing a same amount of a fresh water as the washing liquid which is drained, and the washing is performed until the washing liquid is neutral.

Embodiment 5

A method for preparing a reduced titanium powder by a multistage deep reduction, comprising the following steps:

Step 1: Self-Propagating Reaction

Placing a titanium dioxide powder in a drying oven, performing drying at 100-150° C. for 24 h to obtain a dried titanium dioxide powder, uniformly mixing the dried titanium dioxide powder with a magnesium powder to obtain a mixture, pressing the mixture at 30 MPa to obtain block-shaped semi-finished products, adding the block-shaped semi-finished products of the mixture in a self-propagating reaction furnace, triggering the self-propagating reaction by a local ignition method, controlling the temperature to 700° C., after reacted materials are cooled, obtaining an intermediate product of which low-valence titanium oxides $Ti_xO$ are dispersed in an MgO matrix, wherein $TiO_2:Mg=1:0.9$ by molar ratio, and the intermediate product of which the low-valence titanium oxides $Ti_xO$ dispersed in the MgO matrix is a mixture of non-stoichiometric-ratio low-valence titanium oxides, with x being in the range of 0.6-1.

Step 2: First-Time Leaching

Placing the intermediate product of which the low-valence titanium oxides $Ti_xO$ are dispersed in the MgO matrix in a sealed reaction kettle, leaching the intermediate product with hydrochloric acid as a leaching solution with the leaching temperature of 20° C. and the leaching time of 180 min to obtain a filtrate and a leached product, removing the filtrate, washing the leached product, and performing a vacuum drying to obtain a low-valence titanium oxide $Ti_xO$ precursor, wherein the molar concentration of the hydrochloric acid is 1 mol/L, the addition amount of diluted hydrochloric acid and the addition amount of the intermediate product are in compounding ratio of a hydrochloric acid excess proportion of 30% according to a reaction theory.

The resultant low-valence titanium oxide $Ti_xO$ precursor consists of the following components in percentage by mass: 88% of Ti, 11.9% of O, and unavoidable impurities being smaller than or equal to 0.1%, wherein a sum of the percentage by mass of all components are 100% with a size of 14 μm.

The steps of the washing and the vacuum drying comprise: washing the leached product without the filtrate, with a water until a washing liquid is neutral, and then performing the drying in a vacuum drying oven at a drying temperature of 20° C. for at least 24 h; and the washing is performed with the water, specifically a dynamic washing is adopted, i.e., a constant level of the washing liquid is maintained in a washing tank in the washing process by supplementing a same amount of a fresh water as the washing liquid which is drained, and the washing is performed until the washing liquid is neutral.

Step 3: Second-Time Deep Reduction

Uniformly mixing the low-valence titanium oxide $Ti_xO$ precursor with calcium powder, and performing a pressing at 10 MPa to obtain block-shaped semi-finished products, placing the block-shaped semi-finished products in a vacuum reduction furnace, under the condition that the vacuum degree is smaller than or equal to 10 Pa, performing heating to raise the temperature to 1100° C., performing the second-time deep reduction for 2 h, after the second-time deep reduction, obtaining the block-shaped semi-finished products, cooling the block-shaped semi-finished products along with the furnace to obtain a deep reduction product, wherein $Ti_xO:Ca=1:3$ by molar ratio in the low-valence titanium oxide $Ti_xO$ precursor.

Step 4: Second-Time Leaching

Placing the deep reduction product intermediate product in a sealed reaction kettle, leaching the deep reduction product with hydrochloric acid as a leaching solution with the leaching temperature of 24° C. and the leaching time of 30 min to obtain a leaching solution and filtered residues, removing the leaching solution, washing the filtered residues, and performing a vacuum drying to obtain a reduced titanium powder, wherein the molar concentration of the hydrochloric acid is 1 mol/L, the addition amount of diluted hydrochloric acid and the addition amount of the deep reduction product are in compounding ratio of a hydrochloric acid excess proportion of 20% according to a reaction theory.

The reduced titanium powder comprises the following components in percentage by mass of 99.4% of Ti, 0.12% of O, and the balance being unavoidable impurities, with a size of 40 μm.

The specific steps of the washing and the vacuum drying comprise: washing the leached product without the leaching solution, with a water until a washing liquid is neutral, and then performing the drying in a vacuum drying oven at a drying temperature of 20° C. for at least 24 h; and the washing is performed with the water, specifically a dynamic washing is adopted, i.e., a constant level of the washing liquid is maintained in a washing tank in the washing process by supplementing a same amount of a fresh water as the washing liquid which is drained, and the washing is performed until the washing liquid is neutral.

Embodiment 6

A method for preparing a reduced titanium powder by a multistage deep reduction, comprising the following steps:

Step 1: Self-Propagating Reaction

Placing a titanium dioxide powder in a drying oven, performing drying at 100-150° C. for 24 h to obtain a dried titanium dioxide powder, uniformly mixing the dried titanium dioxide powder with a magnesium powder to obtain a mixture, adding the mixture in a self-propagating reaction furnace, triggering the self-propagating reaction by a local ignition method, controlling the temperature to 650° C., after reacted materials are cooled, obtaining an intermediate product of which low-valence titanium oxides $Ti_xO$ are dispersed in an MgO matrix, wherein $TiO_2$:Mg=1:0.9 by molar ratio, and the intermediate product of which the low-valence titanium oxides $Ti_xO$ dispersed in the MgO matrix is a mixture of non-stoichiometric-ratio low-valence titanium oxides, with x being in the range of 0.6-1.

Step 2: First-Time Leaching

Placing the intermediate product of which the low-valence titanium oxides $Ti_xO$ are dispersed in the MgO matrix in a sealed reaction kettle, leaching the intermediate product with a hydrochloric acid as a leaching solution with the leaching temperature of 25° C. and the leaching time of 120 min to obtain a filtrate and a leached product, removing the filtrate, washing the leached product, and performing a vacuum drying to obtain a low-valence titanium oxide $Ti_xO$ precursor, wherein the molar concentration of the hydrochloric acid is 1 mol/L, the addition amount of diluted hydrochloric acid and the addition amount of the intermediate product are in compounding ratio of a hydrochloric acid excess proportion of 40% according to a reaction theory.

The resultant low-valence titanium oxide $Ti_xO$ precursor consists of the following components in percentage by mass: 75% of Ti, 24.5% of O, and unavoidable impurities being smaller than or equal to 0.5%, wherein a sum of the percentage by mass of the all components are 100%, with a size of 0.8 μm.

The steps of the washing and the vacuum drying comprise: washing the leached product without the filtrate, with a water until a washing liquid is neutral, and then performing the drying in a vacuum drying oven at a drying temperature of 30° C. for at least 24 h; and the washing is performed with the water, specifically a dynamic washing is adopted, i.e., a constant level of the washing liquid is maintained in a washing tank in the washing process by supplementing a same amount of a fresh water as the washing liquid which is drained, and the washing is performed until the washing liquid is neutral.

Step 3: Second-Time Deep Reduction

Uniformly mixing the low-valence titanium oxide $Ti_xO$ precursor with calcium powder, and performing a pressing at 20 MPa to obtain block-shaped semi-finished products, placing the block-shaped semi-finished products in a vacuum reduction furnace, under the condition that the vacuum degree is smaller than or equal to 10 Pa, performing heating to raise the temperature to 1200° C., performing the second-time deep reduction for 1 h, after the second-time deep reduction, obtaining the block-shaped semi-finished products, cooling the block-shaped semi-finished products along with the furnace to obtain a deep reduction product, wherein $Ti_xO$:Ca=1:2 by molar ratio in the low-valence titanium oxide $Ti_xO$ precursor.

Step 4: Second-Time Leaching

Placing the deep reduction product intermediate product in a sealed reaction kettle, leaching the deep reduction product with hydrochloric acid as a leaching solution with the leaching temperature of 20° C. and the leaching time of 90 min to obtain a leaching solution and filtered residues, removing the leaching solution, washing the filtered residues, and performing a vacuum drying to obtain a reduced titanium powder, wherein the molar concentration of the hydrochloric acid is 6 mol/L, the addition amount of diluted hydrochloric acid and the addition amount of the deep reduction product are in compounding ratio of a hydrochloric acid excess proportion of 30% according to a reaction theory.

The reduced titanium powder comprises the following components in percentage by mass of 99.5% of Ti, 0.18% of O, and the balance being unavoidable impurities, with a size of 8 μm.

The specific steps of the washing and the vacuum drying comprise: washing the leached product without the leaching solution, with a water until a washing liquid is neutral, and then performing the drying in a vacuum drying oven at a drying temperature of 30° C. for at least 24 h; and the washing is performed with the water, specifically a dynamic washing is adopted, i.e., a constant level of the washing liquid is maintained in a washing tank in the washing process by supplementing a same amount of a fresh water as the washing liquid which is drained, and the washing is performed until the washing liquid is neutral.

Embodiment 7

A method for preparing a reduced titanium powder by a multistage deep reduction, comprising the following steps:

Step 1: Self-Propagating Reaction

Placing a titanium dioxide powder in a drying oven, performing drying at 100-150° C. for 24 h to obtain a dried titanium dioxide powder, uniformly mixing the dried titanium dioxide powder with a magnesium powder to obtain a mixture, adding the mixture in a self-propagating reaction furnace, triggering the self-propagating reaction by a whole heating method, controlling the temperature to 750° C., after reacted materials are cooled, obtaining an intermediate product of which low-valence titanium oxides $Ti_xO$ are dispersed in an MgO matrix, wherein $TiO_2$:Mg=1:0.9 by molar ratio, and the intermediate product of which the low-valence titanium oxides $Ti_xO$ dispersed in the MgO matrix is a mixture of non-stoichiometric-ratio low-valence titanium oxides, with x being in the range of 0.6-1.

Step 2: First-Time Leaching

Placing the intermediate product of which the low-valence titanium oxides $Ti_xO$ are dispersed in the MgO matrix in a sealed reaction kettle, leaching the intermediate product with a hydrochloric acid as a leaching solution with the leaching temperature of 25° C. and the leaching time of 150 min to obtain a filtrate and a leached product, removing the filtrate, washing the leached product, and performing a vacuum drying to obtain a low-valence titanium oxide $Ti_xO$ precursor, wherein the molar concentration of the hydrochloric acid is 1 mol/L, the addition amount of diluted hydrochloric acid and the addition amount of the intermediate product are in compounding ratio of a hydrochloric acid excess proportion of 10% according to a reaction theory.

The resultant low-valence titanium oxide $Ti_xO$ precursor consists of the following components in percentage by mass: 75-88% of Ti, 12-25% of O, and unavoidable impurities being smaller than or equal to 0.5%, wherein a sum of the percentage by mass of all components are 100%, with a size of 15 μm.

The steps of the washing and the vacuum drying comprise: washing the leached product without the filtrate, with a water until a washing liquid is neutral, and then performing the drying in a vacuum drying oven at a drying temperature of 25° C. for at least 24 h; and the washing is performed with the water, specifically a dynamic washing is adopted, i.e., a constant level of the washing liquid is maintained in a washing tank in the washing process by supplementing a same amount of a fresh water as the washing liquid which is drained, and the washing is performed until the washing liquid is neutral.

Step 3: Second-Time Deep Reduction

Uniformly mixing the low-valence titanium oxide $Ti_xO$ precursor with calcium powder, and performing a pressing at 2 MPa to obtain block-shaped semi-finished products, placing the block-shaped semi-finished products in a vacuum reduction furnace, under the condition that the vacuum degree is smaller than or equal to 10 Pa, performing heating to raise the temperature to 700° C., performing the second-time deep reduction for 6 h, after the second-time deep reduction, obtaining the block-shaped semi-finished products, cooling the block-shaped semi-finished products along with the furnace to obtain a deep reduction product, wherein $Ti_xO:Ca=1:3$ by molar ratio in the low-valence titanium oxide $Ti_xO$ precursor.

Step 4: Second-Time Leaching

Placing the deep reduction product intermediate product in a sealed reaction kettle, leaching the deep reduction product with hydrochloric acid as a leaching solution with the leaching temperature of 24° C. and the leaching time of 60 min to obtain a leaching solution and filtered residues, removing the leaching solution, washing the filtered residues, and performing a vacuum drying to obtain a reduced titanium powder, wherein the molar concentration of the hydrochloric acid is 5 mol/L, the addition amount of diluted hydrochloric acid and the addition amount of the deep reduction product are in compounding ratio of a hydrochloric acid excess proportion of 5% according to a reaction theory.

The reduced titanium powder comprises the following components in percentage by mass of 98% of Ti, and 2% of O, with a size of 40 μm.

The specific steps of the washing and the vacuum drying comprise: washing the leached product without the leaching solution, with a water until a washing liquid is neutral, and then performing the drying in a vacuum drying oven at a drying temperature of 20° C. for at least 24 h; and the washing is performed with the water, specifically a dynamic washing is adopted, i.e., a constant level of the washing liquid is maintained in a washing tank in the washing process by supplementing a same amount of a fresh water as the washing liquid which is drained, and the washing is performed until the washing liquid is neutral.

What is claimed is:

1. A method for preparing a reduced titanium powder by a multistage deep reduction, comprising the following steps:

Step 1:
placing a titanium dioxide powder in a drying oven, performing drying to obtain a dried titanium dioxide powder, uniformly mixing the dried titanium dioxide powder with a magnesium powder to obtain a mixture, adding the mixture in a self-propagating reaction furnace, performing a self-propagating reaction and cooling to obtain an intermediate product of which low-valence titanium oxides $Ti_xO$ are dispersed in an MgO matrix, wherein $TiO_2:Mg=1:0.8-1.2$ by molar ratio, and the intermediate product of which the low-valence titanium oxides $Ti_xO$ dispersed in the MgO matrix is a mixture of non-stoichiometric-ratio low-valence titanium oxides, with x being in the range of 0.6-1;

Step 2:
placing the intermediate product of which the low-valence titanium oxides $Ti_xO$ are dispersed in the MgO matrix in a sealed reaction kettle, leaching the intermediate product with a hydrochloric acid as a leaching solution to obtain a filtrate and a leached product, removing the filtrate, washing the leached product, and performing a vacuum drying to obtain a low-valence titanium oxide $Ti_xO$ precursor, wherein a molar concentration of the hydrochloric acid is 1-6 mol/L;

Step 3:
uniformly mixing the low-valence titanium oxide $Ti_xO$ precursor with a calcium powder in a molar ratio of $Ti_xO:Ca=1:1.5-3$, and performing a pressing at 2-20 MPa to obtain block-shaped semi-finished products, placing the block-shaped semi-finished products in a vacuum reduction furnace, performing heating to raise a temperature to 700-1200° C., performing a second-time deep reduction for 1-6 h, after the second-time deep reduction, obtaining the block-shaped semi-finished products, cooling the block-shaped semi-finished products along with the furnace to obtain a deep reduction product;

Step 4:
placing the deep reduction product in the sealed reaction kettle, leaching the deep reduction product with a hydrochloric acid as a leaching solution to obtain a leaching solution and filtered residues, removing the leaching solution, washing the filtered residues, and performing a vacuum drying so as to obtain a reduced titanium powder, wherein a molar concentration of the hydrochloric acid is 1-6 mol/L,
wherein the reduced titanium powder comprises the following components in percentage by mass of 98-99.5% of Ti, 0.1-2% of O, and a balance being unavoidable impurities, with a size of 8-40 μm.

2. The method according to claim 1, wherein in the step 1, the mixture is treated by one of the following two manners before being placed in the self-propagating reaction furnace:
Mode I: performing a pressing at 10-60 MPa to obtain a block-shaped semi-finished products, and then adding the block-shaped semi-finished products to the self-propagating reaction furnace; and
Mode II: adding the mixture to the self-propagating reaction furnace directly without a treatment.

3. The method according to claim 1, wherein in the step 1, the drying is performed at 100-150° C. for 24 h or above.

4. The method according to claim 1, wherein in the step 1, methods for triggering the self-propagating reaction comprises a method selected from the group consisting of a local ignition method and a whole heating method, wherein the local ignition method means that electric heating wires are used to heat a part of the mixture in the self-propagating reaction furnace to trigger the self-propagating reaction; and the whole heating method means that a temperature of the mixture is wholly raised in the self-propagating reaction furnace until the self-propagating reaction occurs, wherein the temperature is controlled to be 500-750° C. during the self-propagating reaction.

5. The method according to claim 1, wherein in the step 2, when the hydrochloric acid is used as the leaching solution for leaching the intermediate product, an additional amount of a diluted hydrochloric acid and an additional amount of the intermediate product are in a compounding ratio with a 10-40% excess proportion of the hydrochloric acid over the stoichiometric amount required to perform a chemical reaction $MgO+2H^+=Mg^{2+}+H_2O$; and in the step 2, a leaching temperature of the leached intermediate product is 20-30° C. and a leaching time is 60-180 min.

6. The method according to claim 1, wherein in the step 2, the resultant low-valence titanium oxide $Ti_xO$ precursor consists of the following components in percentage by mass: 75-88% of Ti, 12-25% of O, and unavoidable impurities being smaller than or equal to 0.5%, wherein a sum of the percentage by mass of all components are 100%, with a size of 0.8-15 μm.

7. The method according to claim 1, wherein in the step 2, the specific steps of the washing and the vacuum drying comprise: washing the leached product without the filtrate, with a water until a washing liquid is neutral, and then performing the drying in a vacuum drying oven at a drying temperature of 20-30° C. for at least 24 h; and wherein the washing is performed with the water, specifically a dynamic washing is adopted, wherein a constant level of the washing liquid is maintained in a washing tank in the washing process by supplementing a same amount of a fresh water as the washing liquid which is drained, and the washing is performed until the washing liquid is neutral.

8. The method according to claim 1, wherein in the step 3, the second-time deep reduction reaction specifically comprises: raising the temperature in the vacuum reduction furnace while the furnace is at a vacuum degree of smaller than or equal to 10 Pa.

9. The method according to claim 1, wherein in the step 4, when the deep reduction product is leached, an additional amount of a diluted hydrochloric acid and an additional amount of the deep reduction product are in a compounding ratio with a 5-30% excess proportion of the hydrochloric acid over the stoichiometric amount required to perform a chemical reaction $CaO+2H^+=Ca^{2+}+H_2O$; and in the step 4, a leaching temperature of the leached deep reduction product is 20-30° C. and a leaching time is 15-90 min.

10. The method according to claim 1, wherein in the step 4, the specific steps of the washing and the vacuum drying comprise: washing the leached product without the leaching solution, with a water until a washing liquid is neutral, and then performing the drying in a vacuum drying oven at a drying temperature of 20-30° C. for at least 24 h; and wherein the washing is performed with the water, specifically a dynamic washing is adopted, wherein a constant level of the washing liquid is maintained in a washing tank in the washing process by supplementing a same amount of a fresh water as the washing liquid which is drained, and the washing is performed until the washing liquid is neutral.

* * * * *